July 7, 1953

V. A. HAINES 2,644,604

MILK COOLER

Filed Dec. 6, 1949

INVENTOR
VICTOR A. HAINES

ATT'Y

July 7, 1953 V. A. HAINES 2,644,604
MILK COOLER
Filed Dec. 6, 1949 2 Sheets-Sheet 2

INVENTOR
VICTOR A. HAINES
ATT'Y

Patented July 7, 1953

2,644,604

UNITED STATES PATENT OFFICE 2,644,604

MILK COOLER

Victor A. Haines, Evansville, Ind., assignor to International Harvester Company, a corporation of New Jersey Application December 6, 1949, Serial No. 131,415

6 Claims. (Cl. 220—15)

This invention relates to milk coolers, and more particularly to a new and improved device for maintaining a plurality of milk cans or the like submerged and upright within a liquid-filled receptacle.

With the advent of the "pipe line milker" system wherein the milk is caused to flow directly from a cow or other domestic animal to a milk cooler where it is cooled and stored, a difficulty is encountered. Inasmuch as most milk coolers are filled with a cooling liquid, generally water, in which the milk cans are immersed, it will be apparent that the cans when empty or substantially empty at the start of the milking operation will tend to float and topple over because of the buoyancy force of the cooling liquid acting upon the cans. It is therefore one of the primary objectives of the present invention to overcome the above difficulty by providing a new and improved milk cooler.

Another object is the provision of a device positioned within the milk cooler for maintaining the milk cans within the milk cooler submerged and upright even though they are empty.

Still another object is the provision of a holding device which is simple and inexpensive to construct.

The foregoing and other important objects and desirable features inherent in and encompassed by the invention together with many of the purposes and uses thereof will become readily apparent from a reading of the ensuing description in conjunction with the annexed drawings, in which.

Figure 1:
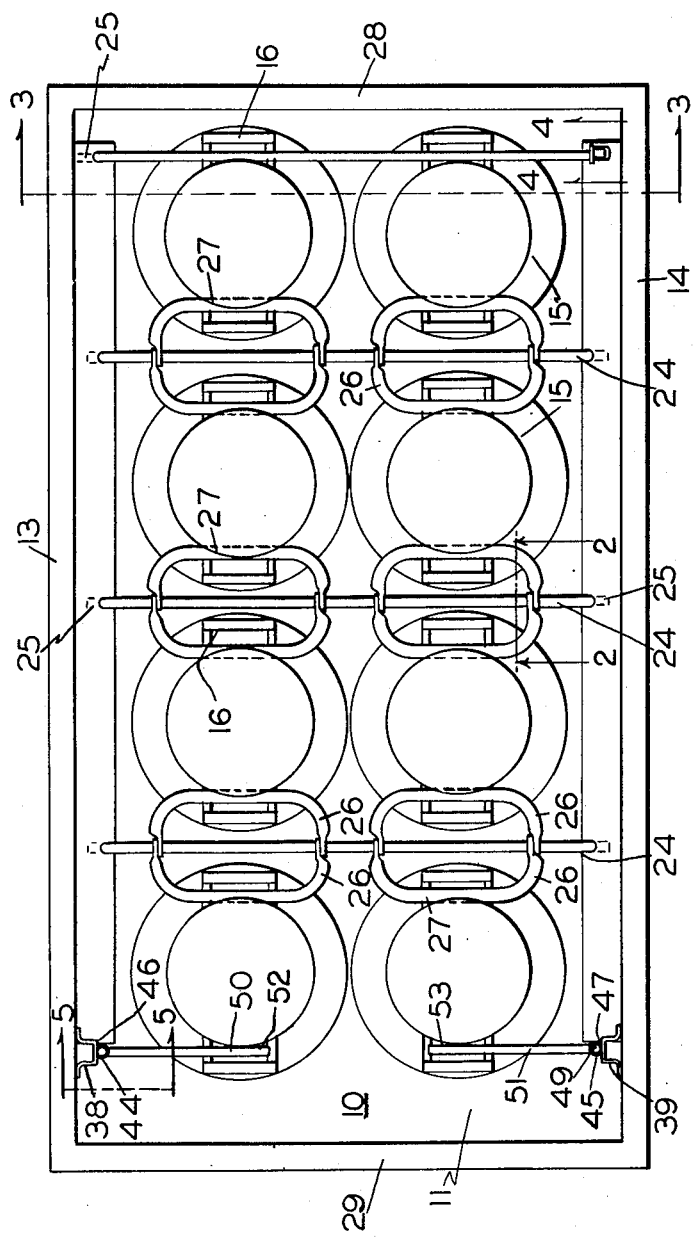
Fig. 1 is a plan view of a milk cooler showing the invention positioned within the milk cooler.
Figure 2:
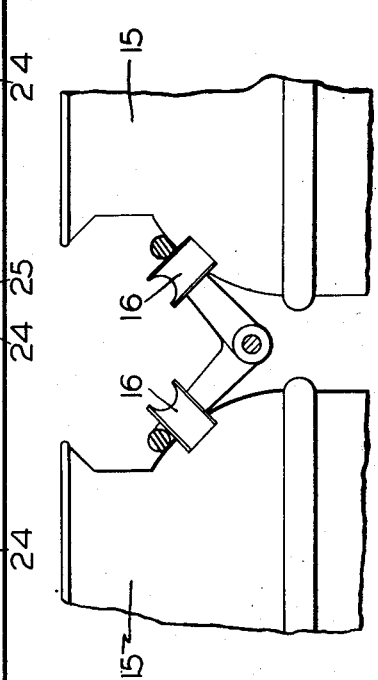
Fig. 2 is an enlarged sectional view taken substantially along line 2—2 of Fig. 1.
Figure 3:
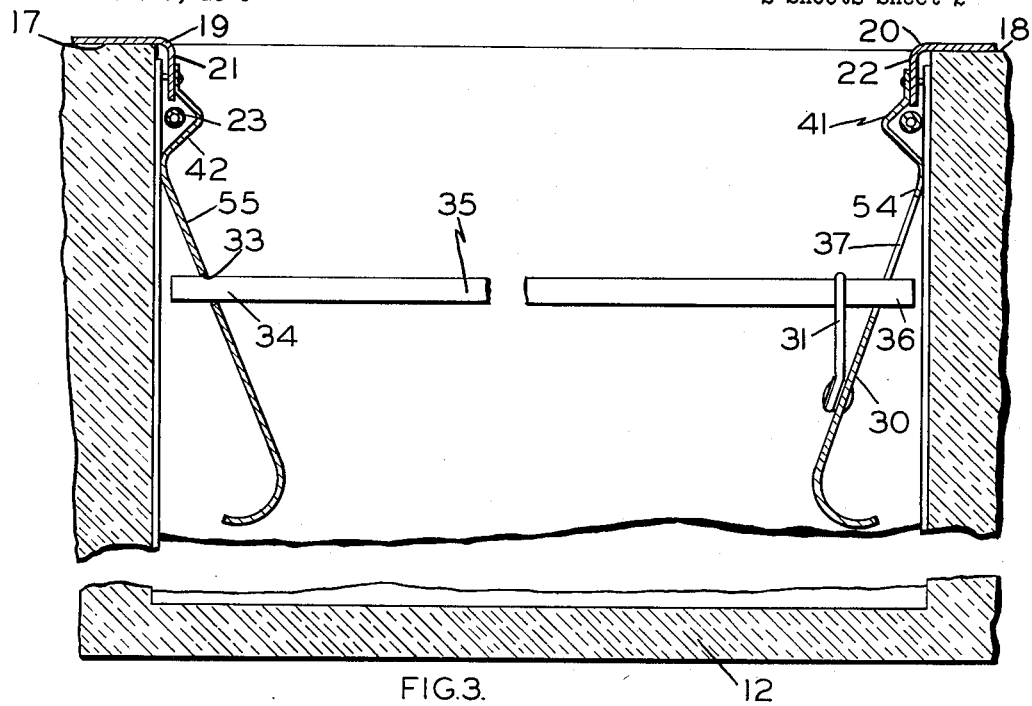
Fig. 3 is a cross sectional view taken substantially along line 3—3 of Fig. 1 with the milk cans removed.
Figure 4:
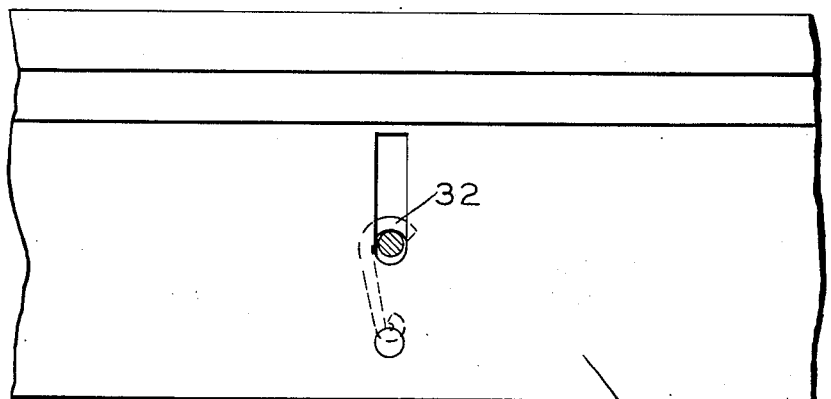
Fig. 4 is a detail view taken substantially along line 4—4 of Fig. 1.
Figure 5:
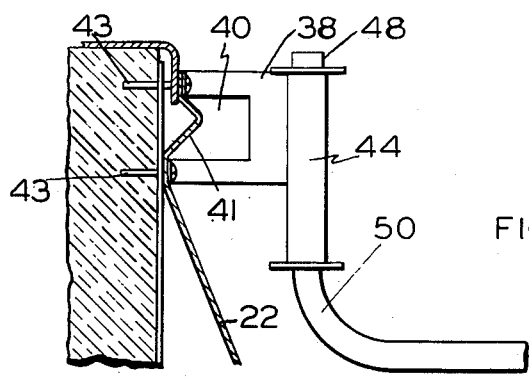
Fig. 5 is a sectional view taken substantially along line 5—5 of Fig. 1.

Referring to the drawings in which like reference characters designate like elements throughout the various views, there is shown a milk cooler 10 which includes a liquid-filled receptacle 11 having an insulated bottom wall 12 and a pair of vertically extending insulated side walls 13, 14. The receptacle 10 is filled with a cooling liquid, generally water, which is maintained at a predetermined height as shown in Fig. 3 to substantially cover a plurality of milk cans 15 positioned within the receptacle 10 but still allowing access to the interior of the cans without permitting the cooling water to enter the cans. The milk cans 15, arranged in two parallel longitudinal lines as shown in Fig. 1, are of conventional type used to ship or store bulk milk and have a pair of diametrically disposed outwardly projecting handles 16.

Secured along the upper marginal edges 17, 18 of the side walls 13, 14 are brackets 19, 20 each having a substantially L-shape. Fastened to the free ends 21, 22 of the brackets 19, 20 are a pair of plate-like downwardly and inwardly projecting coil guards 54, 55. The primary purpose of the coil guards 54, 55 is to prevent injury to a refrigerating coil 23 positioned between the side walls and the coil guards by the milk cans when they are inserted or removed from the milk cooler. Refrigerating apparatus (not shown) circulates a refrigerant through the coil 23, which in turn maintains the cooling liquid at a predetermined temperature.

Longitudinally spaced along the receptacle 11 are a plurality of transversely extending rods 24. The rods 24, it will be noted, are positioned between the milk cans 15 and are vertically spaced from the bottom wall 12. The rods 24 are maintained in position and supported within the receptacle 11 by having their ends inserted in apertures 25 formed in the coil guards 54, 55. Pivotally supported on each of said rods 24 are two pairs of U-shaped yoke members 26. The bight portion 27 of each U-shaped member 26 is adapted to loop over a handle 16 of one of the milk cans 15 adjacent the rod 24 which carries the U-shaped member.

In operation, an empty milk can 15 is manually positioned between two rods 24 and depressed until the milk can 15 abuts the bottom wall 12. The can is then rotated on its vertical axis until the handles 16 may be engaged by a U-shaped member 26 on each of two adjacent rods 24. The U-shaped members 26 are then pivoted to hook over the handles 16 and retain the can 15 in a vertical and upright position.

Inasmuch as the milk cans 15 must be maintained in an upright position as well as submerged in order to efficiently practice the "pipe line milker" system, it will be apparent that special consideration must be given to the milk cans 15 adjacent the longitudinally spaced end walls 28, 29. Each of the four milk cans 15 adjacent the end walls 28, 29 have one handle 16 engaged by a U-shaped member 26. The problem of engaging the diametrically opposite handle 16 is solved in the present invention in two different ways. Pivotally mounted on a lower portion 30 of the coil guard 54 adjacent the end wall 28 is a hook-shaped member 31 having an arcuate portion 32. An aperture 33 is formed in the oppositely facing coil guard 55 to loosely receive one end 34 of a transversely extending rod 35. The other end 36 of the rod 35 extends through a vertically extending slot 37 in coil guard 54 and is adapted to be engaged by the arcuate portion 32 of the hook-shaped member 31. It will be appreciated that two milk cans 15 may be immersed in the cooling water and positioned between the rod 24 adjacent the end wall 28 and the end wall 29. Two laterally spaced U-shaped members 26 are then pivoted so as to engage a handle 16 on each can. The rod 35 is then inserted in the aperture 33 and made to abut the handle 16 of the cans adjacent the end wall 28. The end 36 is then latched in position and prevented from vertical displacement by pivoting hook member 31 to a substantially vertical position whereby the arcuate portion 32 engages the end 33. The vertical slot 37 is provided to permit positioning of the rod 35 over the handles 16 of the milk cans 15. It will be apparent that the cans 15 adjacent the end wall 28 are prevented from floating to the surface of the cooling liquid and toppling over by the rod 35 and the U-shaped members 26 pivotally mounted on the rod 24 adjacent the end wall 28.

The problem of maintaining the milk cans 15 adjacent the end wall 29 submerged and upright is solved in a different manner. As in the case of the cans adjacent the end wall 28 one handle 16 of each can furthest away from the end wall 29 is engaged by a U-shaped member 26 pivotally mounted on the rod 24 adjacent the end wall 29. Positioned on each side wall 13, 14 is a channel-shaped bracket 38, 39 having a cut-out portion 40 adapted to straddle an inwardly facing V-shaped ridge portion 41, 42 of each coil guard 54, 55. The brackets 38, 39 are rigidly held on the side walls 13, 14 by a plurality of wood screws 43 or the like. A vertically extending tubular member 44, 45 is welded on the web-portion 46, 47 of the brackets 38, 39. One leg 48, 49 of a substantially L-shaped member 50, 51 is rotatably journaled within the tubular member 44, 45. The other leg 52, 53 is adapted to be swung from an open position wherein it is adjacent the end wall 29 to a closed position wherein it is substantially normal to the side walls 13, 14. The L-shaped member 50, 51 is swung to the open position to permit the insertion of a milk can 15 in the receptacle 11. The milk can 15 is then rotated about its vertical axis until the handles 16 do not prevent the L-shaped members 50, 51 from being swung to the closed position. The L-shaped members 50, 51 are then swung to the closed position, after which the milk cans are rotated about their vertical axes until the legs 52, 53 are positioned in the V's formed by the handles 16 and the body of the cans. Hence, it will be apparent that the milk cans 15 adjacent the end wall 29 are held submerged and upright within the receptacle 11 by the L-shaped members 50, 51 and a pair of U-shaped members 26.

The embodiment of the invention chosen for the purposes of illustration and description herein is that preferred for achieving the objects of the invention and developing the utility thereof in a most desirable manner. It will be appreciated, however, that the particular structural and functional aspects recited herein are not intended to exclude, but rather to suggest, such other adaptations and modifications of the invention as fall within the spirit and scope of the invention as defined in the appended claims.

What is claimed is:

1. A milk cooler comprising a receptacle having a cooling liquid therein adapted to receive a plurality of milk cans positioned in longitudinally spaced relation, said cans being of the type having a pair of outwardly projecting, diametrically disposed handles; and means for retaining said cans in a substantially submerged and upright condition against the buoyant effect of the cooling liquid when the cans are empty, said means comprising a plurality of rods extending across said receptacle and secured thereto, said rods being transversely spaced with respect to each other and positioned between said cans adjacent diametrically opposite sides of said cans, each rod having a plurality of U-shaped members pivotally mounted thereon adapted to loop over the handles of the cans adjacent to the rod.

2. A milk cooler comprising a receptacle having a cooling liquid therein adapted to receive a plurality of milk cans positioned in longitudinally spaced relation, said cans being of the type having a pair of outwardly projecting, diametrically disposed handles; a pair of transversely spaced coil guards mounted within said receptacle adjacent a pair of oppositely facing side walls of said receptacle; and means for retaining said cans in a substantially submerged and upright condition against the buoyant effect of the cooling liquid when the cans are empty, said means comprising a plurality of rods extending across said receptacle on diametrically opposite sides of said cans and secured to said coil guards, each rod having a plurality of U-shaped members pivotally mounted thereon adapted to loop over the handles of the cans adjacent to the rod.

3. The combination of a liquid-filled receptacle and a plurality of cans positioned upright within said receptacle in spaced relation; said cans being of the type having a pair of outwardly projecting, diametrically disposed handles; and means for retaining said cans in a substantially submerged and upright condition against the buoyant effect of the liquid when the cans are empty, said means comprising a plurality of rods extending across said receptacle and secured thereto, said rods being transversely spaced with respect to each other and positioned on diametrically opposite sides of said cans, each of said rods having a plurality of U-shaped members pivotally mounted thereon adapted to loop over the handles of the cans adjacent to the rod.

4. The combination of a water-filled receptacle of the type used in milk coolers and a pair of milk cans positioned within said receptacle, each of said cans having an outwardly projecting portion, said projecting portions extending toward each other; and means for retaining said cans in a substantially submerged condition, said means comprising a rod positioned between said cans adjacent said outwardly projecting portions having a pair of U-shaped members pivotally mounted thereon, each member being adapted to loop over one of said outwardly projecting portions, said rod being secured to said receptacle.

5. The combination of a liquid-filled receptacle and a can positioned within said receptacle, said can having a pair of outwardly projecting portions, diametrically disposed; and means positioned adjacent said can for retaining said can in a substantially submerged condition, said means comprising a plurality of rods extending across said receptacle on diametrically opposite sides of said can, each rod having a U-shaped member pivotally mounted thereon adapted to loop over said outwardly projecting portions of said can.

6. The combination of a water-filled receptacle of the type used in milk coolers and a plurality of milk cans positioned upright within said receptacle in longitudinally spaced relation, said cans being of the type having a pair of outwardly projecting, diametrically disposed handles; and means for retaining said cans in a substantially submerged and upright condition against the buoyant effect of the water when the cans are empty, said means comprising a plurality of rods extending across said receptacle and secured thereto, said rods being laterally spaced with respect to each other and positioned on diametrically opposite sides of said cans and each having a plurality of U-shaped members pivotally mounted thereon adapted to loop over the handles of the cans adjacent to the rod.

VICTOR A. HAINES.

References Cited in the file of this patent

UNITED STATES PATENTS

| Number | Name | Date |
|---|---|---|
| 114,450 | Lawrence | May 2, 1871 |
| 290,519 | Brandenburg | Dec. 18, 1883 |
| 392,391 | Wilke | Nov. 6, 1888 |
| 516,705 | Harding | Mar. 20, 1894 |
| 681,406 | Chavous | Aug. 27, 1901 |
| 808,093 | Kleiber | Dec. 26, 1905 |
| 884,689 | Tillotson | Apr. 14, 1908 |
| 1,569,793 | Tomhave | Jan. 12, 1926 |
| 1,846,192 | Daniels | Feb. 23, 1932 |
| 1,869,284 | Swanson | July 26, 1932 |
| 1,885,788 | Westburg | Nov. 1, 1932 |
| 2,249,660 | Lee | July 15, 1941 |